(12) United States Patent
Eldar et al.

(10) Patent No.: US 8,607,058 B2
(45) Date of Patent: Dec. 10, 2013

(54) PORT ACCESS CONTROL IN A SHARED LINK ENVIRONMENT

(75) Inventors: Avigdor Eldar, Jerusalem (IL); Eran Rousseau, Rehovot (IL); Tal Shustak, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 714 days.

(21) Appl. No.: 11/529,985

(22) Filed: Sep. 29, 2006

(65) Prior Publication Data

US 2008/0080373 A1 Apr. 3, 2008

(51) Int. Cl.
*H04L 29/06* (2006.01)
*G06F 7/04* (2006.01)

(52) U.S. Cl.
USPC ............................. 713/182; 713/155; 726/27

(58) Field of Classification Search
USPC ......... 370/230, 235, 236, 254, 310, 328, 329, 370/338, 341, 363, 368, 371, 378, 351, 357, 370/360, 381, 389, 473, 474, 395.53, 395, 370/400–404, 412, 419, 422, 431, 466; 709/204, 207, 217–219, 223–227, 709/232–234, 236–238, 250; 713/150–162, 713/168–172, 182–185, 189, 193; 726/1–30
See application file for complete search history.

(56) References Cited

U.S. PATENT DOCUMENTS

| | | | |
|---|---|---|---|
| 6,611,868 B1 * | 8/2003 | Arutyunov | 709/227 |
| 7,181,527 B2 | 2/2007 | Valenci | |
| 7,257,572 B2 | 8/2007 | Eldar | |
| 7,263,685 B2 | 8/2007 | Eldar | |
| 7,284,075 B2 | 10/2007 | Eldar | |
| 7,346,909 B1 | 3/2008 | Eldar | |
| 7,444,511 B2 * | 10/2008 | Morimoto | 713/168 |
| 7,499,547 B2 * | 3/2009 | Zheng et al. | 380/247 |
| 7,502,926 B2 * | 3/2009 | Luo et al. | 713/163 |
| 7,793,338 B1 * | 9/2010 | Beddoe et al. | 726/3 |
| 2003/0161327 A1 | 8/2003 | Vlodavsky | |
| 2003/0217137 A1 * | 11/2003 | Roese et al. | 709/223 |
| 2003/0217151 A1 * | 11/2003 | Roese et al. | 709/225 |
| 2003/0225893 A1 * | 12/2003 | Roese et al. | 709/227 |
| 2003/0233545 A1 | 12/2003 | Eldar | |
| 2004/0158735 A1 * | 8/2004 | Roese | 713/200 |
| 2004/0210761 A1 | 10/2004 | Eldar | |

(Continued)

FOREIGN PATENT DOCUMENTS

WO 01/99369 A2 12/2001
WO 03/096554 A2 11/2003

OTHER PUBLICATIONS

Avigdor Eldar et al., "Dynamic Network Identity Architecture", U.S. Appl. No. 11/316,789, filed Dec. 21, 2005.

(Continued)

*Primary Examiner* — Michael Thier
*Assistant Examiner* — Prince A Mensah
(74) *Attorney, Agent, or Firm* — Grossman, Tucker, Perreault & Pfleger, PLLC

(57) ABSTRACT

In an embodiment, a method is provided. The method of this embodiment provides detecting failure of a first device on a system to authenticate the system through a controlled port from which a service is requested; and using a second device on the system to authenticate the system through the controlled port, the second device sharing a link with the first device.

30 Claims, 3 Drawing Sheets

(56) References Cited

U.S. PATENT DOCUMENTS

| | | | |
|---|---|---|---|
| 2004/0268140 A1* | 12/2004 | Zimmer et al. | 713/200 |
| 2005/0055573 A1* | 3/2005 | Smith | 713/201 |
| 2005/0086465 A1* | 4/2005 | Sapkota et al. | 713/150 |
| 2005/0120213 A1* | 6/2005 | Winget et al. | 713/171 |
| 2005/0125692 A1* | 6/2005 | Cox et al. | 713/201 |
| 2006/0053491 A1* | 3/2006 | Khuti et al. | 726/23 |
| 2006/0059334 A1* | 3/2006 | De Jaegher et al. | 713/159 |
| 2006/0083227 A1 | 4/2006 | Eldar | |
| 2006/0133370 A1 | 6/2006 | Eldar | |
| 2006/0140181 A1 | 6/2006 | Trumper | |
| 2006/0227788 A1 | 10/2006 | Eldar | |
| 2006/0236025 A1 | 10/2006 | Eldar | |
| 2006/0259790 A1* | 11/2006 | Asokan et al. | 713/194 |
| 2006/0282887 A1 | 12/2006 | Trumper | |
| 2006/0288406 A1* | 12/2006 | Kuhn et al. | 726/8 |
| 2006/0294593 A1 | 12/2006 | Eldar | |
| 2007/0005742 A1 | 1/2007 | Eldar | |
| 2007/0005963 A1 | 1/2007 | Eldar | |
| 2007/0005985 A1 | 1/2007 | Eldar | |
| 2007/0006288 A1* | 1/2007 | Mayfield et al. | 726/5 |
| 2007/0067634 A1* | 3/2007 | Siegler | 713/171 |
| 2007/0101406 A1* | 5/2007 | Zavalkovsky et al. | 726/4 |
| 2007/0150564 A1 | 6/2007 | Eldar | |
| 2007/0162607 A1* | 7/2007 | Droms et al. | 709/228 |
| 2007/0230453 A1* | 10/2007 | Giaretta et al. | 370/389 |
| 2007/0234401 A1 | 10/2007 | Eldar | |
| 2007/0297396 A1 | 12/2007 | Eldar | |
| 2008/0005359 A1 | 1/2008 | Khosravi | |
| 2008/0022355 A1* | 1/2008 | Khosravi et al. | 726/1 |
| 2008/0155278 A1* | 6/2008 | Carrico et al. | 713/194 |

OTHER PUBLICATIONS

International Search Report/ Written Opinion for PCT Patent Application No. PCT/US2007/020636, mailed Mar. 10, 2008, 10 Pages.

Eldar et al. "Method and System for Remote Manageability of Networked Computers", U.S. Appl. No. 11/819,505, filed Jun. 27, 2007; 26 pages.

Khosravi, et al. "Enabling Access to Remote Entities in Access Controlled Networks", U.S. Appl. No. 11/899,991, filed Sep. 7, 2007; 22 pages.

Eldar, et al. "Synchronizing Between Host and Management Co-Processor for Network Access Control", U.S. Appl. No. 11/904,322, filed Sep. 26, 2007; 24 pages.

International Preliminary Report on Patentability mailed Apr. 9, 2009 for International Patent Application No. PCT/US2007/020636; 6 pages.

IEEE Standard 802.1X—Port Based Network Access Control, 2004, 179 pages.

PCT Local Bus Specification Revision 3.0, Aug. 12, 2002, 344 pages.

PCT Express Base Specification Revision 1.1, Mar. 28, 2005, 508 pages.

* cited by examiner

PORT ACCESS CONTROL IN A SHARED LINK ENVIRONMENT

FIELD

Embodiments of this invention relate to port access control in a shared link environment.

BACKGROUND

Port access control refers to network access control to restrict access to networks through a port based on authentication information. External devices (i.e., devices external to a system having port access control) that wish to access services via a port must first authenticate themselves and gain authorization before any packets originating from, or destined for, the external device are allowed to pass through the controlled port. Such functionality allows the system (e.g., via a network controller) to restrict external devices from gaining access to the network behind a controlled port. An example of port access control is described in IEEE (Institute of Electrical and Electronics Engineers) Std. 802.1x—Port Based Network Access Control, available from IEEE Corporate Office, 3 Park Avenue, 17th Floor, New York, N.Y., 10016-5997 U.S.A.

In IEEE 802.1x, a supplicant system may request services from a system on which port access control is enabled ("controlled port"). Prior to allowing access to the services on the system, the system may require that the supplicant system be authenticated by an authenticator with which the system is associated (such system hereinafter referred to as "authenticator system"). An authentication server may determine if the authenticator system should grant the supplicant system access to the authenticator system's services by using the authentication credentials supplied by the supplicant system to the authenticator system. If authorization of the supplicant system is successful, the supplicant system may access the services of the authenticator system.

In a supplicant system on which multiple external devices in the system may share a link, and therefore, a single network address, and where the devices may need to access services of the authenticator system independently of one another, a different process may be necessitated.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
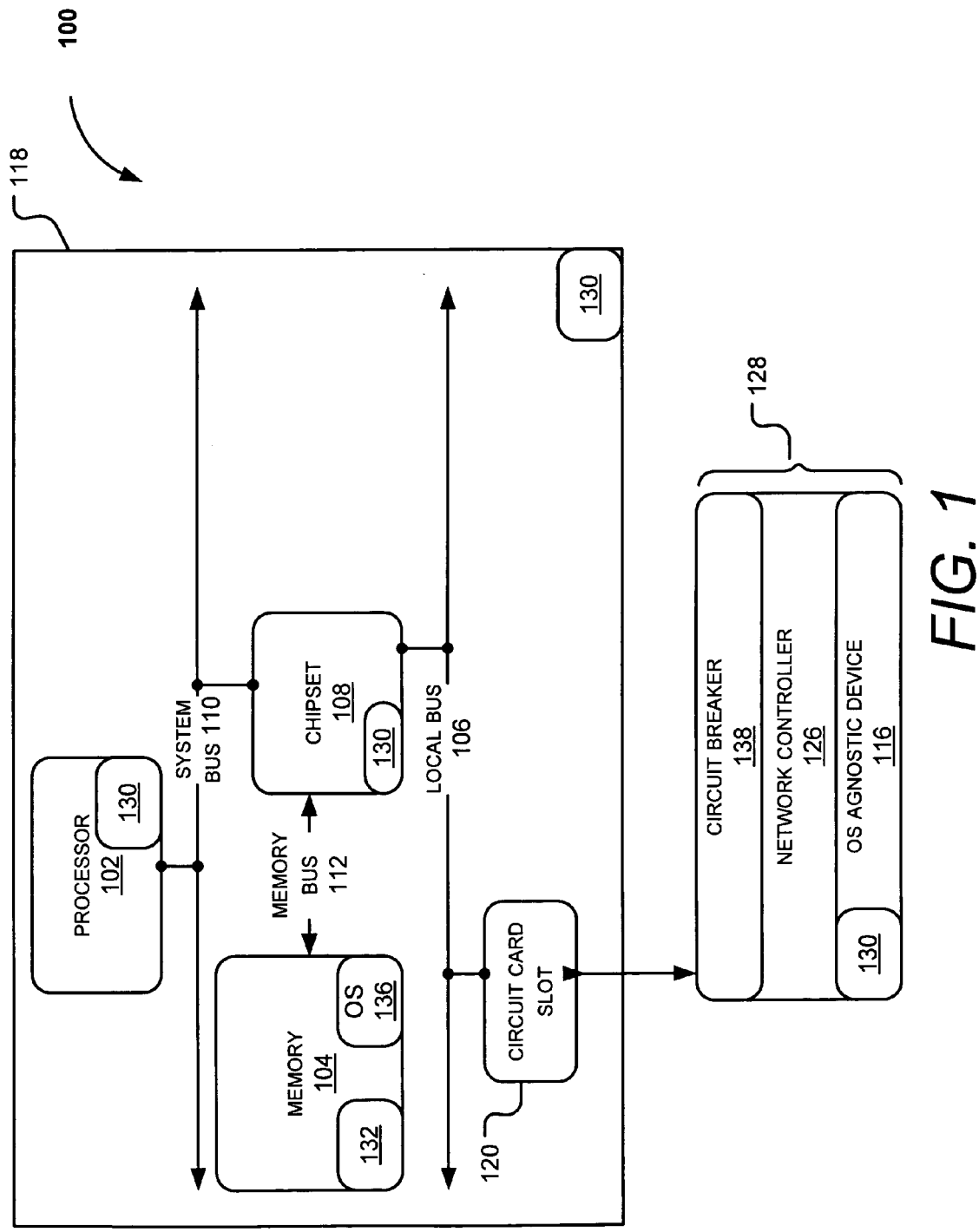
FIG. 1 illustrates a system embodiment.

As illustrated in FIG. 1, system 100 may comprise processor 102. A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set. Alternatively, a processor may comprise just the processing circuitry (e.g., CPU). Another example of a processor is a computational engine that may be comprised in a multi-core processor, for example, where the operating system may perceive the computational engine as a discrete processor with a full set of execution resources. Processor 102 may comprise, for example, an Intel® Pentium® processor, or an Intel® Core™ processor, both commercially available from Intel® Corporation. Of course, alternatively, processor 102 may comprise another type of processor, such as, for example, a microprocessor that is manufactured and/or commercially available from Intel® Corporation, or a source other than Intel® Corporation, without departing from embodiments of the invention. However, these are merely examples of processor and embodiments of the present invention are not limited in this respect.

Memory 104 may store machine-executable instructions 132 that are capable of being executed, and/or data capable of being accessed, operated upon, and/or manipulated by logic, such as logic 130. "Machine-executable" instructions as referred to herein relate to expressions which may be understood by one or more machines for performing one or more logical operations. For example, machine-executable instructions may comprise instructions which are interpretable by a processor compiler for executing one or more operations on one or more data objects. However, this is merely an example of machine-executable instructions and embodiments of the present invention are not limited in this respect.

Memory 104 may additionally store an operating system 116. Operating system 136 may manage system resources and control tasks that are run on system 100. Operating system 136 may comprise one or more protocol stacks to process packets.

Memory 104 may, for example, comprise read only, mass storage, random access computer-accessible memory, and/or one or more other types of machine-accessible memories. The execution of program instructions 132 and/or the accessing, operation upon, and/or manipulation of this data by logic 130 for example, may result in, for example, computing system 100 and/or logic 130 carrying out some or all of the operations described herein.

Logic 130 may comprise hardware, software, or firmware, or combinations thereof. For example, logic 130 may comprise circuitry (i.e., one or more circuits), to perform operations described herein. Logic 130 may be hardwired to perform the one or more operations. For example, logic 130 may comprise one or more digital circuits, one or more analog circuits, one or more state machines, programmable logic, and/or one or more ASIC's (Application-Specific Integrated Circuits). Alternatively or additionally, logic 130 may be embodied in machine-executable instructions 132 stored in a memory, such as memory 104 or non-volatile memory 114, to perform these operations. Alternatively or additionally, logic 130 may be embodied in firmware. Logic may be comprised in various components of computing system 100, including network controller 126, OS agnostic device 116, chipset 108, processor 102, and on motherboard 118. Logic 130 may be used to perform various functions by various components as described herein.

Chipset 108 may comprise a host bridge/hub system that may couple processor 102, and memory 104 to each other and to local bus 106. Chipset 108 may comprise one or more integrated circuit chips, such as those selected from integrated circuit chipsets commercially available from Intel® Corporation (e.g., graphics, memory, and I/O controller hub chipsets), although other one or more integrated circuit chips may also, or alternatively, be used. According to an embodiment, chipset 108 may comprise an input/output control hub (ICH), and a memory control hub (MCH), although embodiments of the invention are not limited by this. Chipset 108 may communicate with memory 104 via memory bus 112 and with processor 102 via system bus 110. In alternative embodiments, processor 102 and memory 104 may be coupled directly to bus 106, rather than via chipset 108.

Local bus 106 may be coupled to a circuit card slot 120 having a bus connector (not shown). Local bus 106 may comprise a bus that complies with the Peripheral Component Interconnect (PCI) Local Bus Specification, Revision 3.0, Feb. 3, 2004 available from the PCI Special Interest Group, Portland, Oreg., U.S.A. (hereinafter referred to as a "PCI bus"). Alternatively, for example, bus 106 may comprise a bus that complies with the PCI Express™ Base Specification, Revision 1.1, Mar. 28, 2005 also available from the PCI Special Interest Group (hereinafter referred to as a "PCI Express bus"). Bus 106 may comprise other types and configurations of bus systems.

System 100 may additionally comprise one or more network controllers 126 (only one shown). A "network controller" as referred to herein relates to a device which may be coupled to a communication medium to transmit data to and/or receive data from other devices coupled to the communication medium, i.e., to send and receive network traffic. For example, network controller 126 may transmit packets to and/or receive packets from devices coupled to a network such as a local area network. As used herein, a "packet" means a sequence of one or more symbols and/or values that may be encoded by one or more signals transmitted from at least one sender to at least one receiver. Such a network controller 126 may communicate with other devices according to any one of several data communication formats such as, for example, communication formats according to versions of IEEE (Institute of Electrical and Electronics Engineers) Std. 802.3, IEEE Std. 802.11, IEEE Std. 802.16, Universal Serial Bus, Firewire, asynchronous transfer mode (ATM), synchronous optical network (SONET) or synchronous digital hierarchy (SDH) standards. The IEEE specifications are available from IEEE Corporate Communications, 445 Hoes Lane, Piscataway, N.J., 08854.

In an embodiment, network controller 126 may be comprised on system motherboard 118. Rather than reside on motherboard 118, network controller 126 may be integrated onto chipset 108, or may instead be comprised in a circuit card 128 (e.g., NIC or network interface card) that may be inserted into circuit card slot 120. Circuit card slot 120 may comprise, for example, a PCI expansion slot that comprises a PCI bus connector (not shown). PCI bus connector (not shown) may be electrically and mechanically mated with a PCI bus connector (not shown) that is comprised in circuit card 128. Circuit card slot 120 and circuit card 128 may be constructed to permit circuit card 128 to be inserted into circuit card slot 120. When circuit card 128 is inserted into circuit card slot 120, PCI bus connectors (not shown) may become electrically and mechanically coupled to each other. When PCI bus connectors (not shown) are so coupled to each other, logic 130 in circuit card 128 may become electrically coupled to system bus 110.

In an embodiment, network controller 126 may be communicatively coupled to local bus 106. Rather than be communicatively coupled to local bus 106, network controller 126 may instead be communicatively coupled to a dedicated bus. As used herein, components that are "communicatively coupled" means that the components may be capable of communicating with each other via wired (e.g., copper or optical wires), or wireless (e.g., radio frequency) means.

System 100 may additionally comprise host operating system agnostic device ("OS agnostic device") 116. In an embodiment, OS agnostic device 116 may be comprised in network controller 126. Alternatively, OS agnostic device 116 may be comprised in a chip. For example, OS agnostic device 116 may be comprised in a chip embedded within chipset 108. However, embodiments are not limited in this respect, and other possibilities may exist.

System 100 may additionally comprise circuit breaker 138. Circuit breaker 138 may comprise filters to prevent network traffic from being transmitted to or transmitted from operating system 136. In an embodiment, OS agnostic device 116 controls configuration of circuit breaker 138.

System 100 may comprise more than one, and other types of memories, buses, processors, and network controllers. For example, system 100 may comprise multiple processors 102 and multiple network controllers 126. Processor 102, memory 104, and buses 106, 110, 112 may be comprised in a single circuit board, such as, for example, a system motherboard 118, but embodiments of the invention are not limited in this respect.

Figure 2:
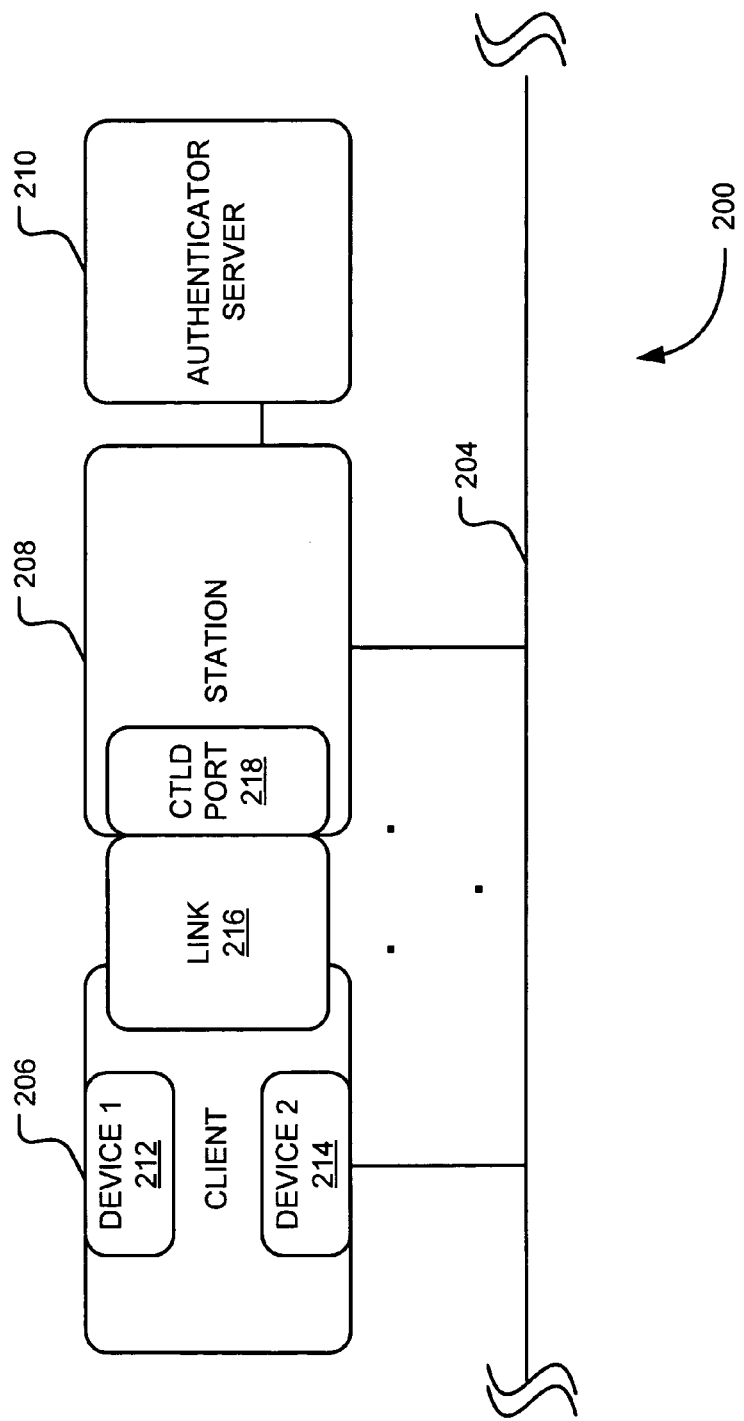
FIG. 2 illustrates a network embodiment.

As shown in FIG. 2, computing system 100 may operate in a network 200. Network 200 may comprise at least one node 206, 208 (only two shown) where nodes may be communicatively coupled together via a communication medium 204. Also, one or more of the nodes 206, 208 may comprise one or more intermediate stations (not shown), such as, for example, one or more hubs, switches, and/or routers; additionally or alternatively, one or more of the nodes 206, 208 may comprise one or more end stations. Communication medium 204 may communicatively couple together at least some of the nodes 206, 208 and one or more of intermediate stations. Of course, many alternatives are possible. Furthermore, nodes 206, 208 may transmit and receive sets of one or more signals via communication medium 204 that may encode one or more packets.

In an embodiment, node 206 may comprise a client 206, and node 208 may comprise a station 208. Client 206 may request access to services offered through controlled port 218 by station 208. For example, client 206 may comprise system 100. Station 208 may control physical access to its services via port 218 based on the authentication status of client 206. Examples of services include, but are not limited to, network file system operations, web access, and email access. In an embodiment, station 208 may comprise a switch, although embodiments of the invention are not limited in this respect, and may alternatively comprise a hub, or a wireless access point, for example.

In an embodiment station 208 may be communicatively coupled to authenticator server 210. In such embodiment, station 208 may act as an intermediary between client 206 and authentication server 210 to request identity information from client 206, to verify the information with authentication server 210, and to relay the response to client 206.

In an embodiment, client 206 and station 208 may both comply with IEEE 802.1x port authentication in which EAP (Extensible Authentication Protocol) is used. In this embodiment, until client 206 is authenticated, IEEE 802.1x access control only allows EAPOL (EAP over LAN) through the port 218 to which client 206 is connected. After authentication is established, normal traffic can pass through port 218.

Client 206 may request services offered by station 208 (e.g., switch). Through a series of EAP frame exchanges, station 208 may authenticate client 206 using authentication server 210. The specific exchange of EAP frames may depend on the authentication method being used. For example, client 206 may transmit an EAPOL-Start frame to station 208 to which station 208 may respond with an EAPOL-Request/Identity frame to client 206. Client 206 may then respond with an EAPOL-Response/Identity frame that may include the client's 206 credentials, and station 208 may authenticate client 206 based, at least in part, on those credentials. "Credentials" refer to information that may be used to verify that a client says who the client. Such information may comprise, for example, certificates (e.g., Internet Engineering Task Force Public Key Infrastructure X.509), and username/password pairs (e.g., pre-shared secrets).

Figure 3:
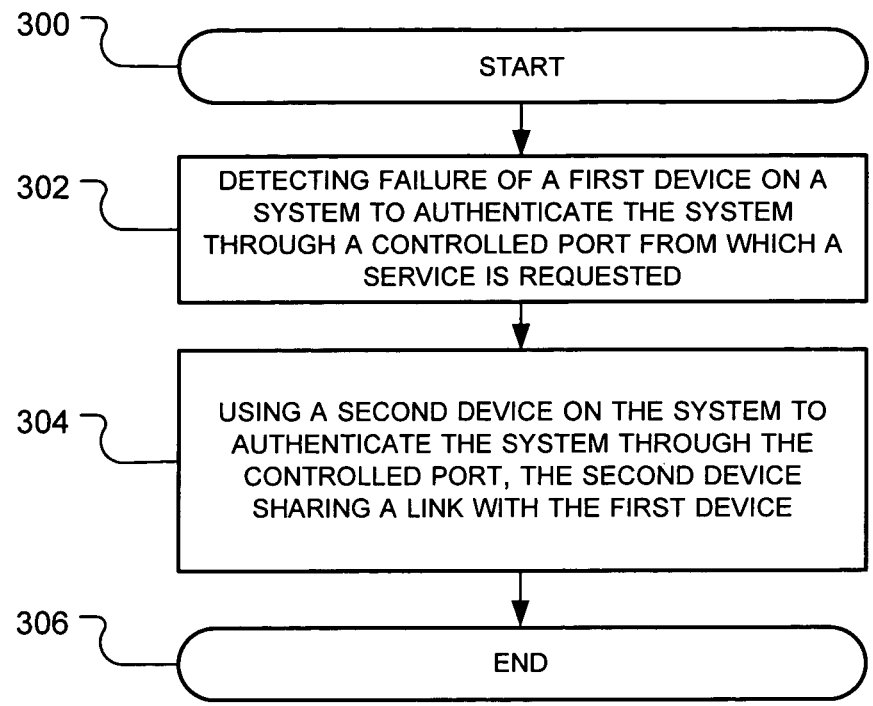
FIG. 3 is a flowchart that illustrates a method in one embodiment.

A method according to an embodiment is illustrated in FIG. 3. The method of FIG. 3 begins at block 300 and continues to block 302 where the method may comprise detecting failure of a first device on a system to authenticate the system through a controlled port from which a service is requested. In an embodiment, first device 212 may comprise operating system 136. Furthermore, in an embodiment, controlled port 218 may be an IEEE 802.1x controlled port.

In an embodiment, operating system 136 may request services from station 208 over controlled port 218. To do this, operating system 136 may attempt to authenticate system 100 to station 208 over controlled port 218. Through a series of EAP frame exchanges, station 208 may authenticate system 100 using authentication server 210. If operating system 136 is able to authenticate system 100, traffic to and from system 100 may be passed through port 218. If operating system 136 is not able to authenticate system 100, system 100 may be authenticated using second device 214 (to be discussed below).

In an embodiment, detecting failure of the first device on the system to authenticate the system through a controlled port from which a service is requested may comprise determining that a primary network session has not been established by the first device. In an embodiment, primary network session refers to a network session established between operating system 136 and station 208. In embodiments of the invention, a network session may be established following successful port authentication. A network session may be initiated by acquiring a network address (e.g., IP (Internet Protocol) address). This may be done, for example, by calling a DHCP (Dynamic Host Configuration Protocol) server.

Detecting that a primary network session has not been established by the first device may be accomplished by active sensing of network connectivity or passive sensing of network connectivity. Active sensing of data refers to sensing network connectivity by initiating activity over a network, and passive sensing refers to sensing network connectivity without initiating activity over a network.

An example of active sensing of data includes sending ARP (Address Resolution Protocol) requests to the network. ARP is a protocol that converts a network address (e.g., IP (Internet Protocol) address) to a physical (e.g., MAC (Media Access Control)) address. An "ARP request" refers to a request to obtain a physical address. When a physical address is obtained, an entry is created in an ARP table of the requesting system, where each entry may map an IP address to a physical address. For example, ARP requests may be sent to pre-configured entities, or recently known entities, such as a DHCP server, a DNS (Domain Name System) server, or management consoles. Receipt of an ARP reply from an entity may indicate that there is network connectivity, and, therefore, that system 100 has been authenticated over controlled port 218.

An example of passive sensing of data includes checking for inbound network activity. This may be accomplished by, for example, checking for entries in the ARP table. Since the ARP table includes network address to physical address mappings that are created in response to receiving a response from an entity over the network, entries in the ARP table are indicative of successful communication between the requesting system and an entity on the network. Thus, entries in the ARP table may indicate that there is network connectivity, and that the system has been authenticated over the controlled port.

In an embodiment, passive sensing of data may be performed before performing active sensing of data in order to minimize impact on the network. In this embodiment, if network connectivity cannot be determined using passive sensing, active sensing is initiated. If, after active sensing is performed, network connectivity is sensed, the method may continue from block 302 block 306. If, after active sensing, network connectivity is not sensed, the method may continue to block 304. Alternatively, if network connectivity is not sensed, passive sensing may be performed, followed by active sensing if needed, until network connectivity is sensed, or for a predetermined number of times, prior to the method continuing to block 304.

At block 304, the method may comprise using a second device on the system to authenticate the system through the controlled port, the second device sharing a link with the first device.

In an embodiment, second device 214 may comprise OS agnostic device 116. OS agnostic device may refer to a device that may operate independently of an operating system, and may enable manageability. Manageability refers to a computer system's ability to enable out-of-band ("OOB") manageability as well as in-band manageability of a system, which may include, for example, system diagnostics, software updates, and/or system inventory. OOB manageability refers to manageability of a system independently of the state of the operating system running on the system. OOB management may occur regardless of the system power or OS state, and may be used to provide remote system information, diagnostics, debugging, updating, and control capabilities, for example. OOB manageability may occur, for example, when an OS is inoperable, or when a system is powered off. In contrast, in-band manageability refers to management of a system via the operating system. In-band manageability may occur when the operating system is operational. The manageability feature may be found, for example, in Intel® Active Management Technology.

Furthermore, second device 214 may share a link 216 with first device 212. As used herein, a link refers to a line or a channel over which data may be transmitted. In embodiments of the invention, link 216 may terminate at controlled port 218. In IEEE 802.1x, since port authentication is performed at the physical layer (e.g., Ethernet), only a single supplicant (e.g., device 212 or device 214) can perform IEEE 802.1x port authentication. Once a device on a system successfully establishes IEEE 802.1x port authentication, another device on the system may piggyback the connection to maintain its own presence. Therefore, since first and second device 212, 214 share link 216 that terminates at controlled port 218, only one of first device 212 and second device 214 may perform port authentication.

In an embodiment, second device 214 may authenticate the system through the controlled port 218 by blocking first device 212 from transmitting and receiving network traffic, and initiating authentication of itself through the controlled port. In an embodiment, second device 214 (e.g., OS agnostic device 116) may block first device 212 (e.g., operating system 136) from receiving network traffic by configuring circuit breaker 138 to filter out network packets destined for operating system 136 and sourced from operating system 136.

Initiating authentication of second device 214 through controlled port 218 may comprise sending an EAPOL-Start frame to station 208. If, through the series of frame exchanges, port authentication is successful, then second device 214 may establish an alternate network session. An alternate network session refers to a network session established between OS agnostic device 116 and station 208, and may be initiated by acquiring a network address (e.g., IP address), from, for example, a DHCP server. However, if port authentication is not successful, second device 214 may unblock first device 212 from transmitting and receiving network traffic.

In an embodiment, second device 214 (e.g., OS agnostic device 116) initiate authentication of itself through the controlled port by providing credentials to controlled port 218 different from credentials provided by first device 212 (e.g., operating system 136) to authenticate first device 212 to controlled port 218.

After a specified time period, second device 214 may attempt to relinquish control back to first device 212. This may be accomplished by ending the alternate network session; unblocking first device 212 from transmitting and receiving network traffic; and initiating authentication of the system 100 through controlled port 218.

The method may end at block 306.

CONCLUSION

Embodiments of the invention may provide a method. The method may include detecting failure of a first device on a system to authenticate the system through a controlled port from which a service is requested; and using a second device on the system to authenticate the system through the controlled port, the second device sharing a link with the first device.

In an embodiment, an operating system and an OS agnostic device on a system share a link that terminates at an IEEE 802.1x controlled port. Consequently, only one of devices (e.g., operating system or OS agnostic device) may perform port authentication. For systems in which port authentication is required, and manageability is employed, it is important that a persistent network connection to the system and/or OS agnostic device be maintained. Therefore, such systems need to be authenticated through a controlled port even when the operating system is down. In embodiments of the invention, an OS agnostic device is able to establish port authentication if it detects that the operating system is unable. Consequently, a network connection can be maintained, and may enable the OS agnostic device to perform manageability functions if needed.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method comprising:

detecting failure of a first device on a single client node to authenticate the client node through a controlled port from which a service is requested; and using a second device on the client node to authenticate the client node through the controlled port, the second device sharing a link with the first device;

wherein:

said detecting failure of the first device on the client node to authenticate the client node through a controlled port from which a service is requested comprises determining that a primary network session has not been established by the first device by way of at least one of passive sensing of network connectivity or active sensing of network connectivity;

using the second device on the client node to authenticate the system through the controlled port comprises:

blocking the first device from transmitting and receiving network traffic; and initiating authentication of the second device through the controlled port, wherein said initiating authentication comprises providing credentials to the controlled port that are different from credentials provided by the first device to authenticate the first device to controlled port.

2. The method of claim 1, wherein the controlled port is an IEEE (Institute of Electrical and Electronics Engineers) 802.1x controlled port.

3. The method of claim 1, further comprising executing a host operating system with the first device.

4. The method of claim 3, wherein the second device comprises a host operating system agnostic device.

5. The method of claim 1, wherein said determining that a primary network session has not been established by the first device comprises passive sensing of network connectivity.

6. The method of claim 1, wherein said determining that a primary network session has not been established by the first device additionally comprises active sensing of network connectivity.

7. The method of claim 1, additionally comprising the second device establishing an alternate network session if the port authentication is successful.

8. The method of claim 7, additionally comprising after a specified time period, the second device attempting to relinquish control to the first device by:

ending the alternate network session;

unblocking the first device from transmitting and receiving network traffic; and initiating authentication of the client node through the controlled port.

9. The method of claim 1, additionally comprising the second device unblocking the first device from transmitting and receiving network traffic if the port authentication is not successful.

10. An apparatus comprising:

logic on a second device of a single client node to:

detect failure of a first device on the client node to authenticate the client node through a controlled port from which a service is requested comprising determining that a primary network session has not been established by the first device, the first device sharing a link with the second device; and block the first device from transmitting and receiving network traffic;

initiate authentication of the second device through the controlled port by providing credentials to the controlled port that are different from credentials provided by the first device to authenticate the first device to the controlled port; and authenticate the client node through the controlled port; wherein:

said logic is selected from the group consisting of hardware, firmware, a computer readable medium comprising machine readable instructions which when executed by said second device cause said second device to detect said failure and to authenticate said client through said controlled port, and combinations thereof.

11. The apparatus of claim 10, wherein the controlled port is an IEEE (Institute of Electrical and Electronics Engineers) 802.1x controlled port.

12. The apparatus of claim 10, wherein the second device comprises a host operating system agnostic device.

13. The apparatus of claim 12, additionally comprising logic for the second device to establish an alternate network session if the port authentication is successful.

14. The apparatus of claim 13, wherein said logic is further to, after a specified time period, attempt to relinquish control to the first device by:

ending the alternate network session;

unblocking the first device from transmitting and receiving network traffic; and initiating authentication of the client node through the controlled port.

15. A client system comprising at least one client node, wherein each client node comprises:

a circuit board that includes a circuit card slot;

a first device coupled to the circuit board; and a circuit card that is capable of being coupled to the circuit board via the circuit card slot, the circuit card comprising a second device, the second device and first device sharing a link; wherein the second device includes logic to:

detect failure of the first device to authenticate the client node through a controlled port from which a service is requested; and authenticate the client node through the controlled port.

16. The system of claim 15, wherein the first device comprises a host operating system.

17. The system of claim 16, wherein the second device comprises a host operating system agnostic device.

18. The system of claim 15, wherein said logic comprises logic to determine that a primary network session has not been established by the first device.

19. The system of claim 15, wherein said logic to authenticate the client node through the controlled port comprises logic to:

block the first device from transmitting and receiving network traffic; and initiate authentication of the second device through the controlled port.

20. The system of claim 19, wherein said logic to initiate authentication of second device through the controlled port comprises logic to provide credentials to the controlled port different from credentials provided by the first device to authenticate first device to the controlled port.

21. The system of claim 19, additionally comprising logic for the second device to establish an alternate network session if the port authentication is successful.

22. The system of claim 21, additionally comprising after a specified time period, logic for the second device to attempt to relinquish control to the first device by:

ending the alternate network session;

unblocking the first device from transmitting and receiving network traffic; and initiating authentication of the client node through the controlled port.

23. The system of claim 22, additionally comprising logic for the second device to unblock the first device from transmitting and receiving network traffic if the port authentication is not successful.

24. A method comprising:

detecting failure of a first device on a single client node to authenticate the client node through a controlled port from which a service is requested; and using a second device on the client node to authenticate the client node through the controlled port, the second device sharing a link with the first device;

wherein using the second device on the client node to authenticate the system through the controlled port comprises:

blocking the first device from transmitting and receiving network traffic; and initiating authentication of the second device through the controlled port comprising providing credentials to the controlled port that are different from credentials provided by the first device to authenticate the first device to controlled port.

25. A method comprising:

detecting failure of a first device on a single client node to authenticate the client node through a controlled port from which a service is requested; and using a second device on the client node to authenticate the client node through the controlled port and to establish an alternate network session if the port authentication is successful, the second device sharing a link with the first device;

wherein using the second device on the client node to authenticate the system through the controlled port comprises:

blocking the first device from transmitting and receiving network traffic; and initiating authentication of the second device through the controlled port.

26. The method of claim 25, additionally comprising after a specified time period, the second device attempting to relinquish control to the first device by:

ending the alternate network session;

unblocking the first device from transmitting and receiving network traffic; and initiating authentication of the client node through the controlled port.

27. A method comprising:

detecting failure of a first device on a single client node to authenticate the client node through a controlled port from which a service is requested; and using a second device on the client node to authenticate the client node through the controlled port and to unblock the first device from transmitting and receiving network traffic if the port authentication is not successful, the second device sharing a link with the first device;

wherein using the second device on the client node to authenticate the system through the controlled port comprises:

blocking the first device from transmitting and receiving network traffic; and initiating authentication of the second device through the controlled port.

28. An apparatus comprising:
logic on a second device of a single client node to:
  detect failure of a first device on the client node to authenticate the client node through a controlled port from which a service is requested, the first device sharing a link with the second device; and
  authenticate the client node through the controlled port comprising logic to:
    block the first device from transmitting and receiving network traffic; and
    initiate authentication of the second device through the controlled port, wherein said logic to initiate authentication of second device through the controlled port comprises logic to provide credentials to the controlled port different from credentials provided by the first device to authenticate the first device to the controlled port.

29. An apparatus comprising:
logic on a second device of a single client node to:
  detect failure of a first device on the client node to authenticate the client node through a controlled port from which a service is requested, the first device sharing a link with the second device;
  authenticate the client node through the controlled port comprising logic to:
    block the first device from transmitting and receiving network traffic; and
    initiate authentication of the second device through the controlled port; and
  establish an alternate network session if the port authentication is successful.

30. The apparatus of claim 29, additionally comprising after a specified time period, logic for the second device to attempt to relinquish control to the first device by:
  ending the alternate network session;
  unblocking the first device from transmitting and receiving network traffic; and
  initiating authentication of the client node through the controlled port.

* * * * *

UNITED STATES PATENT AND TRADEMARK OFFICE
CERTIFICATE OF CORRECTION

PATENT NO. : 8,607,058 B2
APPLICATION NO. : 11/529985
DATED : December 10, 2013
INVENTOR(S) : Eldar Avigdor et al.

It is certified that error appears in the above-identified patent and that said Letters Patent is hereby corrected as shown below:

In the Claims:

In column 9, line 7, in claim 10, delete "a computer" and insert -- a non-transitory computer --, therefor.

In column 9, line 19-20, in claim 13, delete "additionally comprising logic for the second device" and insert -- wherein said logic is further --, therefor.

In column 9, line 44, in claim 15, delete "port." and insert -- port; wherein said logic is selected from the group consisting of hardware, firmware, a non-transitory computer readable medium comprising machine readable instructions which when executed by said second device cause said second device to detect said failure and to authenticate said client through said controlled port, and combinations thereof. --, therefor.

In column 9, line 49-50, in claim 18, delete "comprises logic" and insert -- is further --, therefor.

In column 9, line 52, in claim 19, delete "wherein said logic to" and insert -- wherein during said --, therefor.

In column 9, line 53-54, in claim 19, delete "port comprises logic to:" and insert -- port, said logic causes said second device to: --, therefor.

In column 9, line 60, in claim 20, delete "wherein said logic to" and insert -- wherein during said --, therefor.

In column 9, line 61, in claim 20, delete "of" and insert -- of said --, therefor.

In column 9, line 61-62, in claim 20, delete "port comprises logic to" and insert -- port, said logic causes said second device to --, therefor.

Signed and Sealed this
Eleventh Day of March, 2014

Michelle K. Lee
*Deputy Director of the United States Patent and Trademark Office*

CERTIFICATE OF CORRECTION (continued)

U.S. Pat. No. 8,607,058 B2

In column 9, line 65-66, in claim 21, delete "additionally comprising logic for the second device to" and insert -- wherein said logic is further cause the second device to --, therefor.

In column 10, line 1, in claim 22, delete "additionally comprising after a" and insert -- wherein after a --, therefor.

In column 10, line 2, in claim 22, delete "period, logic for" and insert -- period, said logic causes --, therefor.

In column 10, line 9-10, in claim 23, delete "additionally comprising logic for the second device to unblock" and insert -- wherein said logic causes the second device to unblock --, therefor.

In column 11, line 17, in claim 28, delete "wherein" and insert -- wherein: --, therefor.

In column 11, line 17-19, in claim 28, delete "to initiate authentication of second device through the controlled port comprises logic to" and insert -- causes said second device to --, therefor.

In column 11, line 22, in claim 28, delete "port." and insert -- port; and said logic is selected from the group consisting of hardware, firmware, a non-transitory computer readable medium comprising machine readable instructions which when executed by said second device cause said second device to detect said failure and to authenticate said client through said controlled port, and combinations thereof. --, therefor.

In column 12, line 13, in claim 29, delete "successful." and insert -- successful; wherein said logic is selected from the group consisting of hardware, firmware, a non-transitory computer readable medium comprising machine readable instructions which when executed by said second device cause said second device to detect said failure and to authenticate said client through said controlled port, and combinations thereof. --, therefor.

In column 12, line 14-15, in claim 30, delete "additionally comprising after a" and insert -- wherein after a --, therefor.

In column 12, line 15, in claim 30, delete "logic for the second" and insert -- said logic causes the second --, therefor.